(12) United States Patent
Yokota et al.

(10) Patent No.: US 8,888,347 B2
(45) Date of Patent: Nov. 18, 2014

(54) LIGHT DIFFUSING SHEET AND BACKLIGHT USING SAME

(75) Inventors: Hiroshi Yokota, Saitama (JP); Shingo Ohsaku, Saitama (JP)

(73) Assignee: Kimoto Co., Ltd., Tokyo (JP)

( * ) Notice: Subject to any disclaimer, the term of this patent is extended or adjusted under 35 U.S.C. 154(b) by 155 days.

(21) Appl. No.: 13/516,742

(22) PCT Filed: Dec. 16, 2010

(86) PCT No.: PCT/JP2010/072703
§ 371 (c)(1),
(2), (4) Date: Jun. 17, 2012

(87) PCT Pub. No.: WO2011/074647
PCT Pub. Date: Jun. 23, 2011

(65) Prior Publication Data
US 2012/0257410 A1    Oct. 11, 2012

(30) Foreign Application Priority Data

Dec. 17, 2009 (JP) ................................. 2009-285981
Dec. 17, 2009 (JP) ................................. 2009-285984

(51) Int. Cl.
*F21V 13/02* (2006.01)
*G02B 5/02* (2006.01)
*G02F 1/1335* (2006.01)

(52) U.S. Cl.
CPC ........ *G02B 5/0242* (2013.01); *G02F 1/133606* (2013.01); *G02B 5/0221* (2013.01)
USPC ............ 362/606; 428/134; 428/141; 428/143

(58) Field of Classification Search
CPC ............................ G02B 5/0221; G02B 5/0242
USPC .......................... 362/606; 428/134, 141, 143
See application file for complete search history.

(56) References Cited

U.S. PATENT DOCUMENTS

| 5,852,514 | A | 12/1998 | Toshima et al. |
| 5,885,490 | A | 3/1999 | Kawaguchi et al. |
| 2007/0171654 | A1 | 7/2007 | Etori |
| 2010/0027296 | A1 | 2/2010 | Hamada |

FOREIGN PATENT DOCUMENTS

| JP | 8-211205 | A | | 8/1996 |
| JP | 9-127314 | A | | 5/1997 |
| JP | 2009-265640 | A | | 11/2009 |
| JP | 2009265640 | A | * | 11/2009 |
| JP | 2009-288732 | A | | 12/2009 |
| WO | 2005/085914 | A1 | | 9/2005 |
| WO | 2008/090642 | A1 | | 7/2008 |

OTHER PUBLICATIONS

International Search Report for PCT/JP2010/072703 dated Mar. 1, 2011.

* cited by examiner

*Primary Examiner* — Ahn Mai
*Assistant Examiner* — Elmito Breval
(74) *Attorney, Agent, or Firm* — Kenealy Vaidya LLP

(57) ABSTRACT

A light diffusing sheet can include a diffusion layer. The diffusion layer has a surface profile that satisfies certain conditions.

14 Claims, 1 Drawing Sheet

LIGHT DIFFUSING SHEET AND BACKLIGHT USING SAME

LIST OF RELATED CASES

This application is a U.S. national phase filing under 35 U.S.C. §371 of PCT Application No. PCT/JP2010/072703, filed Dec. 16, 2010, and claims priority under 35 U.S.C. §119 to Japanese patent application nos. 2009-285981 and 2009-285984, both filed Dec. 17, 2009, the entireties of all of which are incorporated herein by reference.

TECHNICAL FIELD

The presently disclosed subject matter relates to a light diffusing sheet, for example, used in a backlight of a liquid crystal display. The presently disclosed subject matter specifically relates to a light diffusing sheet which is capable of exhibiting high front luminance and diffusibility required as a light diffusing sheet and a backlight using the same.

BACKGROUND ART

Recently, a color liquid crystal display is used in various fields such as a laptop computer, a desktop computer, a cell phone, a PDA, a car navigation device, a PND, a game machine, and a portable music player. The color liquid crystal display is provided with a liquid crystal cell and a backlight. As the structure of the backlight, a direct type structure in which a light source is provided directly below the liquid crystal cell through a diffusion plate, an edge light type structure in which a light source is provided on the side of a light guide plate, or the like is known.

For such backlights, optical members such as a light diffusing sheet for uniformly emitting light from the light source and a prism sheet for increasing front luminance are laminated on a light exit surface of a light guide plate or diffusing plate (Patent Document 1).

DOCUMENT LIST

Patent Document

Patent Document 1: JP-A-9-127314 (claim 1, paragraph number 0034)

SUMMARY

Recently, specifically in the fields of a cell phone, a PDA and the like, higher resolution images are in a visible environment, for example, one-segment broadcasting is viewable. In order to make such high resolution images visible, a liquid crystal pixel of a liquid crystal cell provided in a liquid crystal display tends to be made smaller and smaller, and when using the liquid crystal pixel, the light transmittance from a light source is drastically reduced than usual, and the liquid crystal display has poor front luminance.

In order to improve the reduction in front luminance, high brightness of backlight has been demanded, and high brightness LED has been recently used as a light source on the demand. A backlight designed using the high brightness LED as the light source is likely to generate large bias in brightness between the site near the light source and other sites, and brightness distribution in the light exit surface of the backlight is further likely to be non-uniform than usual. Therefore, when the conventionally used light diffusing sheet is used as it is, light from high brightness LED cannot be sufficiently diffused, thus the brightness distribution remains to be non-uniform.

On the other hand, when a design such as merely increasing the content of a diffusing agent in a light diffusing sheet is provided in order to compensate for the reduced diffusibility, the diffusibility is increased, but then front luminance is poor. That is, in an environment in which visibility of recent highly colorful images is required, it can not be said that a light diffusion film having both diffusibility and front luminance are sufficiently designed.

Therefore, the presently disclosed subject matter provides, in one aspect, a light diffusing sheet which is capable of achieving high front luminance, while maintaining adequate diffusibility and a backlight using the same.

Solutions to the Problems

As a result of intensive studies on the aforementioned problems, the present inventors have found that high front luminance is achieved while maintaining adequate diffusibility by having a specific surface profile of a diffusion layer, thus the presently disclosed subject matter has been accomplished.

More specifically, the light diffusing sheet of the presently disclosed subject matter comprises a diffusion layer, wherein the diffusion layer has a surface profile that satisfies the following conditions 1 and 2 and/or the following condition 3.

Condition 1: a condition under which when the kurtosis (JIS B0601, 2001) of a roughness curve as determined by two-dimensional surface profile measurement is represented by Rku, Rku is not less than 3.0, Condition 2: a condition under which when the arithmetic mean roughness (JIS B0601, 2001) as determined by two-dimensional surface profile measurement is represented by Ra, Ra is not more than 1.5 μm, and Condition 3: a condition under which when the mean height (JIS B0601, 2001) of roughness curve elements as determined by two-dimensional surface profile measurement is represented by Rc and the mean length (JIS B0601, 2001) of roughness curve elements as determined by two-dimensional surface profile measurement is represented by RSm, the ratio of RSm to Rc (RSm/Rc) is not less than 7.0.

In the presently disclosed subject matter, the diffusion layer may satisfy only conditions 1 and 2, may satisfy only condition 3, and may satisfy all of conditions 1 to 3.

The light diffusing sheet of the presently disclosed subject matter can be used, for example, in a backlight in which a high brightness LED light source having a luminous intensity of not less than 1000 mcd is incorporated. Even used for this purpose, as compared to the case using a light diffusing sheet with a conventional configuration, light from the high brightness LED can be sufficiently diffused, and consequently, luminance distribution on a light exit surface of the backlight can be made uniform.

Also, the backlight of the presently disclosed subject matter comprises at least a light source, an optical plate for light guiding or diffusion disposed adjacent to the light source, and a light diffusing sheet disposed on the light exit side of the optical plate, wherein the light diffusing sheet is the light diffusing sheet of the presently disclosed subject matter. As the light source, for example, an LED light source such as a high brightness LED light source having a luminous intensity of not less than 1000 mcd can be used.

According to the presently disclosed subject matter, a light diffusing sheet which is capable of achieving high front luminance, while maintaining diffusibility required as a light diffusing sheet that is conventionally difficult to achieve can be provided by having a specific surface profile of a diffusion layer.

Recently, a thinner liquid crystal display has been specifically increasingly required, and when the conventional light diffusing sheet is made thinner, the balance of front luminance and diffusibility tends to be further degraded. However, according to the light diffusing sheet of the presently disclosed subject matter, both front luminance and diffusibility are remarkably exhibited even making the light diffusing sheet thinner.

Hereinbelow, the embodiment of the light diffusing sheet of the presently disclosed subject matter will be described.

The light diffusing sheet of the presently disclosed subject matter comprises a diffusion layer. This diffusion layer is adjusted to a specific profile in its surface. Specifically, the surface profile of the diffusion layer is adjusted so as to satisfy either or both of conditions 1 and 2 and condition 3.

Condition 1 is a condition under which when the kurtosis (JIS B0601, 2001) of a roughness curve as determined by two-dimensional surface profile measurement is represented by Rku, Rku is not less than 3.0. Condition 2 is a condition under which when the arithmetic mean roughness (JIS B0601, 2001) as determined by two-dimensional surface profile measurement is represented by Ra, Ra is not more than 1.5 μm. Condition 3 is a condition under which when the mean height (JIS B0601, 2001) of roughness curve elements as determined by two-dimensional surface profile measurement is represented by Rc and the mean length (JIS B0601, 2001) of roughness curve elements as determined by two-dimensional surface profile measurement is represented by RSm, the ratio of RSm to Rc (RSm/Rc) is not less than 7.0.

The light diffusing sheet of the presently disclosed subject matter comprises a diffusion layer, and the light diffusing sheet may be constituted by a single layer of the diffusion layer or may be constituted by laminating the diffusion layer on a support.

One example of the diffusion layer has a surface profile that satisfies condition 1 and condition 2 described above. When either condition 1 or condition 2 is not satisfied, it may not be preferable since the diffusion layer cannot obtain a desired surface profile and thus has poor front luminance.

Another example of the diffusion layer has a surface profile that satisfies condition 3 described above. Still another example of the diffusion layer has a surface profile that satisfies all of conditions 1 to 3 described above.

The diffusion layer of the presently disclosed subject matter is adjusted so as to satisfy either or both of conditions 1 and 2, as well as condition 3, namely, has a specific number range of two-dimensional surface profile, thereby having a surface profile where a plurality of minute convex portions are formed with undulation between the convex portions. Based on such a surface profile, when light entering to a light diffusing sheet transmits through the surface of the diffusion layer and exits, front luminance can be improved while appropriately diffusing the exit light by the surface profile of the diffusion layer. Accordingly, not only light diffusibility, an initial function of the diffusion layer, is exhibited, but also, more amount of exit light can be refracted and focused to the front direction, and thus front luminance can be also improved.

Figure 1:
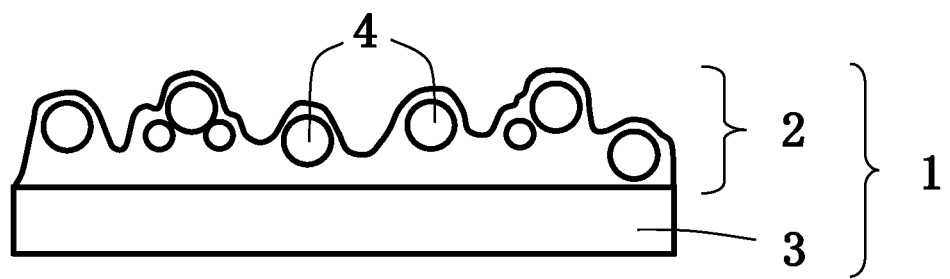
FIG. 1 is a cross-sectional view showing one embodiment of the light diffusing sheet of the presently disclosed subject matter.

A schematic view of a cross-sectional profile when cross-sectioned perpendicular to a light exit surface of the light diffusing sheet of the presently disclosed subject matter is shown in FIG. 1. A light diffusing sheet 1 shown in FIG. 1 is obtained by forming a diffusion layer 2 on a support 3 as set forth below, and a diffusing agent 4 is added in the diffusion layer 2.

In the diffusion layer of the presently disclosed subject matter, Rku in condition 1 is more preferably not more than 5.0, from the viewpoint of preventing reduction in diffusibility. Ra in condition 2 is also more preferably not less than 0.5 μm, from the viewpoint of preventing reduction in diffusibility.

Rc in condition 3 is, specifically, preferably not less than 3.0 μm and not more than 8.0 μm. RSm in condition 3 is, specifically, preferably not less than 30 μm and not more than 90 μm. RSm/Rc in condition 3 is preferably not less than 8.0 from the viewpoint of more preferably exhibiting diffusibility, and further, preferably not more than 30.0 from the viewpoint of preventing reduction in diffusibility.

The light diffusion layer of the presently disclosed subject matter can be formed, for example, by a shape transfer technique according to the 2P (Photo-Polymer) method, the 2T (Thermal-Transformation) method, the embossing method and the like, using a binder resin. Alternatively, the light diffusion layer can be also formed by coating a coating solution including a binder resin, a diffusing agent and the like and drying the solution, without using a shape transfer technique. In the case of shape transfer techniques, since the uneven profile of the presently disclosed subject matter can be formed by a shape transfer using a mold having an uneven profile complementary to the desired uneven surface profile of the presently disclosed subject matter, thus can be constituted only by the binder resin without using particles such as a diffusing agent involving the formation of uneven profile. On the other hand, in the case of forming by a coating solution including the binder resin, the diffusing agent and the like, without using a shape transfer technique, the desired uneven surface profile of the presently disclosed subject matter can be achieved by setting the average particle size and coefficient of variation for the particle size distribution of the diffusing agent, the content ratio of the diffusing agent to that of the binder resin in the diffusion layer, the thickness of the diffusing layer and the like in the appropriate ranges set forth below.

As the binder resin contained in the diffusion layer of the presently disclosed subject matter, resins showing excellent optical transparency can be used. There can be used, for example, thermoplastic resins, thermosetting resins and ionizing radiation curable resins, such as polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, polyethylene resins, polystyrene resins, polyamide resins, polyimide resins, melamine resins, phenol resins, and silicone resins. Among them, acrylic resins showing excellent light resistance and optical characteristics can be used.

Subsequently, as the diffusing agent, inorganic microparticles such as those of silica, clay, talc, calcium carbonate, calcium sulfate, barium sulfate, aluminum silicate, titanium oxide, synthetic zeolite, alumina, and smectite, as well as organic microparticles such as those of styrene resin, urethane resin, benzoguanamine resin, silicone resin, and acrylic resin can be used. Among them, organic microparticles can be used, from the viewpoint of improving brightness performance, and organic microparticles including an acrylic resin can be used. Not only one kind of the diffusing agent, but also plural kinds of the diffusing agents can be used in combination.

Although the shape of the diffusing agent is not particularly limited, it can be a spherical particle that is excellent in light diffusibility. In addition, the diffusing agent has an average particle size of preferably from 1 to 40 µm, from the viewpoint of making it easier to obtain the desired surface profile of the diffusion layer of the presently disclosed subject matter and having preferable performance balance of light diffusibility and front luminance. Further, the diffusing agent has an average particle size of more preferably from 1 to 20 µm, from the viewpoint of preventing glaring due to light transmission through the light diffusion layer and reducing cost.

The coefficient of variation for the particle size distribution of the diffusing agent is preferably from about 5 to 55% and more preferably from 10 to 30%, from the viewpoint of making it easier to obtain the desired surface profile of the diffusion layer of the presently disclosed subject matter.

The content ratio of the diffusing agent to the binder resin in the diffusion layer of the presently disclosed subject matter cannot generally be defined, since it may vary depending on the average particle size of the diffusing agent to be used and the thickness of the light diffusion layer. However, from the viewpoint of making it easier to obtain the desired surface profile of the diffusion layer of the presently disclosed subject matter and having preferable performance balance of light diffusibility and front luminance, the diffusing agent can be contained in an amount of from 50 to 200 parts by weight, with respect to 100 parts by weight of the binder resin. Further, from the viewpoint of preventing degradation of transparency due to difference in the refractive indexes of the resin and the microparticles and reducing cost, the diffusing agent can be contained in an amount of from 50 to 120 parts by weight.

To the diffusion layer, besides the aforementioned binder resin and diffusing agent, there may be added additives such as photopolymerization initiators, photopolymerization enhancers, surfactants such as leveling agents and antifoams, anti-oxidants and ultraviolet absorbers.

When the light diffusing sheet of the presently disclosed subject matter is constituted by a single layer of the diffusion layer, the diffusion layer has a thickness of preferably from 10 to 500 µm and more preferably from 10 to 250 µm. With a thickness of not less than 10 µm, sufficient film strength and favorable handling properties can be secured. On the other hand, with a thickness of not more than 500 µm, favorable transparency of the diffusion layer can be secured. Also, when the diffusion layer is formed on a support, the diffusion layer has a thickness of preferably from 5 to 60 µm and more preferably from 7 to 30 µm, from the viewpoint of making it easier to obtain the surface profile of the diffusion layer of the presently disclosed subject matter while exhibiting the light diffusing performance. Herein, the thickness of the diffusion layer refers to the thickness from the top of the convex of the uneven surface in the diffusion layer to the surface of the opposite surface to the uneven surface.

Next, when the light diffusing sheet of the presently disclosed subject matter has a support, the support can be used without being particularly limited. For example, there can be used transparent plastic films including one kind of material or a mixture of two or more kinds of materials such as polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, vinyl resins, polyethylene resins, polystyrene resins, polypropylene resins, polyamide resins, polyimide resins, melamine resins, phenol resins, silicone resins, fluororesins, and cyclic olefin. Among them, a polyethylene terephthalate film subjected to a stretching process, especially a biaxial stretching process, can be used, since such a film shows excellent mechanical strength and dimensional stability. Further, in order to improve adhesiveness to the light diffusion layer, a support of which surface is subjected to a corona discharge treatment, or a support provided with an easy adhesion layer can also be used. Herein, the support preferably has a thickness of usually from about 10 to 400 µm.

Also, the surface of the light diffusing sheet of the presently disclosed subject matter, which is opposite to the uneven surface, may be subjected to a fine matting treatment in order to prevent adhesion with other members, or may be subjected to an anti-reflection treatment in order to improve light transmittance. Furthermore, a back coat layer, an antistatic layer or a pressure-sensitive adhesive layer may be provided thereon by the coating and drying methods as described below.

Herein, while a light diffusing sheet generally has a total thickness of usually from about 20 to 460 µm, excellent front luminance and diffusibility are exhibited so long as the diffusion layer is adjusted to satisfy either or both of conditions 1 and 2, as well as condition 3, even though the diffusion layer has a thin thickness and the light diffusing sheet is thin-gage with a total thickness of from about 20 to 80 µm. Therefore, when a thin-gage light diffusing sheet that is conventionally difficult to satisfy both light diffusibility and front luminance is designed, the light diffusing sheet of the presently disclosed subject matter is more preferably applied.

When the light diffusing sheet of the presently disclosed subject matter is prepared by coating and the like without using a shape transfer technique, a coating solution for diffusion layer prepared by dissolving materials such as the aforementioned binder resin and diffusing agent in an appropriate solvent is coated on a support by a conventionally known method, for example, bar coating, blade coating, spin coating, roller coating, gravure coating, flow coating, die coating, spray, and screen printing, and drying the solution. In addition, the light diffusing sheet consisting of a single layer of the diffusion layer can be prepared from the diffusion layer formed on a support by removing the support by delamination.

According to the light diffusing sheet of the presently disclosed subject matter described above, since both diffusibility and front luminance are satisfied even in an environment of a recent high-resolution liquid crystal display, it is suitably used in various fields such as a laptop computer, a desktop computer, a cell phone, a PDA, a car navigation device, a PND, a game machine, and a portable music player.

Next, embodiments of the backlight of the presently disclosed subject matter provided with the light diffusing sheet of the presently disclosed subject matter will be described. The backlight of the presently disclosed subject matter comprises at least the light diffusing sheet of the presently disclosed subject matter and a light source. Although the direction of the light diffusing sheet in the backlight is not particularly limited, it can be used such that the uneven surface should serve as the light exit surface. The backlight can adopt a constitution of a so-called edge light type or direct type.

An edge light type backlight device comprises a light guide plate, a light source disposed along at least one end of the light guide plate, a light diffusing sheet disposed on the light exit surface side of the light guide plate, and the like. Herein, the light diffusing sheet can be used such that the uneven surface should serve as the light exit surface. Moreover, a prism sheet may be used between the light guide plate and the light diffusing sheet. With such a configuration, a backlight device having excellent balance of front luminance and viewing angle can be provided.

The light guide plate has a substantially plate-like shape at least one of which sides serves as a light incident surface and one of which surfaces substantially perpendicular to the side serves as a light exit surface, and mainly includes a matrix resin selected from highly transparent resins such as polymethyl methacrylate. Resin particles having a refractive index different from that of the matrix resin may be added as required. Each surface of the light guide plate may not be a uniform plane, but may have a complicated surface profile, or may be subjected to diffusion printing for a dot pattern or the like.

The light source is disposed along at least one end of the light guide plate, and a cold-cathode tube, LED light source and the like are mainly used. The shape of the light source includes a point shape, linear shape, L-shape, and the like. Among these light sources, when an LED light source, especially, a high brightness LED light source having a luminous intensity of from about 1000 to 2000 mcd is used, it is difficult to achieve balance of front luminance and light diffusibility as a backlight device. However, even in such a case, a backlight device can have excellent balance of front luminance and light diffusibility by combining with the light diffusing sheet of the presently disclosed subject matter.

The edge light type backlight device is provided with, besides the aforementioned light diffusing sheet, light guide plate and light source, a light reflector, a polarization film, an electromagnetic wave shield film and the like, depending on the purpose.

Next, a direct type backlight device comprises a light diffusing sheet, a light diffusing member and a light source provided in order on a surface of the light diffusing sheet opposite to the light exit surface, and the like. Herein, the light diffusing sheet can be used such that the uneven surface should serve as the light exit surface. Moreover, a prism sheet may be used between the light diffusing member and the light diffusing sheet. With such a configuration, a backlight device having excellent balance of front luminance and viewing angle can be provided.

The light diffusing member is for erasing a pattern of the light source, and a milky white resin plate, a transparent film on which a dot pattern is formed on a portion corresponding to the light source (lighting curtain) as well as a so-called light diffusion film having an uneven light diffusion layer on a transparent substrate and the like can be used independently or in a suitable combination.

As the light source, those similar to those used for the aforementioned edge light type backlight device can be used. Also, the direct type backlight device may be provided with, besides the aforementioned light diffusing sheet, light diffusing member and light source, a light reflector, a polarization film, an electromagnetic wave shield film and the like, depending on the purpose.

The backlight device of the presently disclosed subject matter comprises at least a light source, an optical plate for light guiding or diffusion disposed adjacent to the light source, and a light diffusing sheet disposed on the light exit side of the optical plate, and uses the aforementioned light diffusing sheet of the presently disclosed subject matter as the light diffusing sheet, and thus can have excellent balance of front luminance and light diffusibility.

EXAMPLES

Hereinafter, the presently disclosed subject matter will be further described with reference to Examples. The term "part" and symbol "%" are used in weight basis, unless especially indicated.

1. Preparation of Light Diffusing Sheets

Example 1

A coating solution for light diffusion layer of the following composition was mixed, and the mixture was stirred, then coated on a support consisting of a polyethylene terephthalate film having a thickness of 50 μm (Lumirror or T60, Toray Industries, Inc.) so as to have a dry thickness of 10 μm by the bar coating method, and dried to form a light diffusion layer, to obtain a light diffusing sheet of Example 1.

<Coating Solution for Light Diffusion Layer of Example 1>

| | |
|---|---|
| Acrylic polyol (ACRYDIC A-807, DIC Corporation) | 10 parts |
| Isocyanate curing agent (Takenate D110N, Mitsui Chemicals, Inc.) | 2 parts |
| Polymethyl methacrylate truly spherical particles (average particle size: 8 μm, coefficient of variation: 20%) | 7 parts |
| Diluting solvent | 32 parts |

Example 2

The same procedures were carried out as in Example 1 except for changing the coating solution for light diffusion layer in Example 1 to a coating solution for light diffusion layer of the following composition and designing so as to have a dry thickness of 11 μm, to obtain a light diffusing sheet of Example 2.

<Coating Solution for Light Diffusion Layer of Example 2>

| | |
|---|---|
| Acrylic polyol (ACRYDIC A-807, DIC Corporation) | 10 parts |
| Isocyanate curing agent (Takenate D110N, Mitsui Chemicals, Inc.) | 2 parts |
| Polymethyl methacrylate truly spherical particles (average particle size: 8 μm, coefficient of variation: 10%) | 6 parts |
| Diluting solvent | 22 parts |

Example 3

The same procedures were carried out as in Example 1 except for changing the coating solution for light diffusion layer in Example 1 to a coating solution for light diffusion layer of the following composition and designing so as to have a dry thickness of 11 μm, to obtain a light diffusing sheet of Example 3.

<Coating Solution for Light Diffusion Layer of Example 3>

| | |
|---|---|
| Acrylic polyol (ACRYDIC A-807, DIC Corporation) | 10 parts |
| Isocyanate curing agent (Takenate D110N, Mitsui Chemicals, Inc.) | 2 parts |

-continued

| | |
|---|---|
| Polymethyl methacrylate truly spherical particles (average particle size: 8 μm, coefficient of variation: 30%) | 6 parts |
| Diluting solvent | 23 parts |

Example 4

The same procedures were carried out as in Example 1 except for changing the coating solution for light diffusion layer in Example 1 to a coating solution for light diffusion layer of the following composition and designing so as to have a dry thickness of 10 μm, to obtain a light diffusing sheet of Example 4.
<Coating Solution for Light Diffusion Layer of Example 4>

| | |
|---|---|
| Acrylic polyol (ACRYDIC A-807, DIC Corporation) | 10 parts |
| Isocyanate curing agent (Takenate D110N, Mitsui Chemicals, Inc.) | 2 parts |
| Polymethyl methacrylate truly spherical particles (average particle size: 10 μm, coefficient of variation: 10%) | 5 parts |
| Diluting solvent | 23 parts |

Comparative Example 1

The same procedures were carried out as in Example 1 except for changing the coating solution for light diffusion layer in Example 1 to a coating solution for light diffusion layer of the following composition and designing so as to have a dry thickness of 13 μm, to obtain a light diffusing sheet of Comparative Example 1.
<Coating Solution for Light Diffusion Layer of Comparative Example 1>

| | |
|---|---|
| Acrylic polyol (ACRYDIC A-807, DIC Corporation) | 10 parts |
| Isocyanate curing agent (Takenate D110N, Mitsui Chemicals, Inc.) | 2 parts |
| Polymethyl methacrylate truly spherical particles (average particle size: 8 μm, coefficient of variation: 30%) | 9 parts |
| Diluting solvent | 33 parts |

Comparative Example 2

The same procedures were carried out as in Example 1 except for changing the coating solution for light diffusion layer in Example 1 to a coating solution for light diffusion layer of the following composition and designing so as to have a dry thickness of 18 μm, to obtain a light diffusing sheet of Comparative Example 2.
<Coating Solution for Light Diffusion Layer of Comparative Example 2>

| | |
|---|---|
| Acrylic polyol (ACRYDIC A-807, DIC Corporation) | 10 parts |
| Isocyanate curing agent (Takenate D110N, Mitsui Chemicals, Inc.) | 2 parts |
| Polymethyl methacrylate truly spherical particles (average particle size: 10 μm, coefficient of variation: 30%) | 11 parts |
| Diluting solvent | 28 parts |

Comparative Example 3

The same procedures were carried out as in Example 1 except for changing the coating solution for light diffusion layer in Example 1 to a coating solution for light diffusion layer of the following composition and designing so as to have a dry thickness of 12 μm, to obtain a light diffusing sheet of Comparative Example 3.
<Coating Solution for Light Diffusion Layer of Comparative Example 3>

| | |
|---|---|
| Acrylic polyol (ACRYDIC A-807, DIC Corporation) | 10 parts |
| Isocyanate curing agent (Takenate D110N, Mitsui Chemicals, Inc.) | 2 parts |
| Polymethyl methacrylate truly spherical particles (average particle size: 8 μm, coefficient of variation: 20%) | 10 parts |
| Diluting solvent | 36 parts |

2. Two-Dimensional Surface Profile Measurement of Diffusion Layers of Light Diffusing Sheets For the surfaces of the diffusion layers of the light diffusing sheets of Examples 1 and 2 and Comparative Examples 1 to 3, the kurtosis of a roughness curve Rku as determined by two-dimensional surface profile measurement and the arithmetic mean roughness Ra as determined by two-dimensional surface profile measurement were each measured at arbitrary ten points using a stylus-type surface profiler (SAS-2010 SAU-II, MEISHIN KOKI Co., Ltd., tip radius: 5 μm, material: diamond, measurement force: 0.8 mN), and the mean values thereof were obtained. The measurement results are shown in Table 1.

For the surfaces of the diffusion layers of the light diffusing sheets of Examples 1, 3 and 4 and Comparative Examples 2 and 3, the mean height of roughness curve elements Rc and mean length of roughness curve elements RSm as determined by two-dimensional surface profile measurement were each measured at arbitrary ten points using the same profiler, and the mean values thereof were obtained. Then, the ratio of the mean value of the mean length of roughness curve elements RSm to the mean value of the mean height of roughness curve elements Rc, RSm/Rc, was calculated. The mean values of the mean height of roughness curve elements Rc and mean length of roughness curve elements RSm and the calculation result of RSm/Rc are shown in Table 2.

TABLE 1

| | Kurtosis Rku | Arithmetic Mean Roughness Ra (μm) |
|---|---|---|
| Example 1 | 3.27 | 1.42 |
| Example 2 | 4.76 | 0.75 |
| Comparative Example 1 | 2.74 | 1.87 |
| Comparative Example 2 | 3.48 | 2.25 |
| Comparative Example 3 | 2.81 | 1.35 |

TABLE 2

| | Mean Height of Roughness Curve Elements Rc (μm) | Mean Length of Roughness Curve Elements RSm (μm) | RSm/Rc |
|---|---|---|---|
| Example 1 | 5.7 | 50.8 | 8.91 |
| Example 3 | 6.6 | 68.6 | 10.4 |

TABLE 2-continued

| | Mean Height of Roughness Curve Elements Rc (μm) | Mean Length of Roughness Curve Elements RSm (μm) | RSm/Rc |
|---|---|---|---|
| Example 4 | 4.2 | 50.6 | 12.2 |
| Comparative Example 2 | 8.4 | 53.3 | 6.35 |
| Comparative Example 3 | 5.3 | 30.8 | 5.81 |

2. Preparation of Backlights

Next, the light diffusing sheet obtained in each Example was incorporated into a 2.4-inch edge light type backlight (containing 4 lamps of LED light source having a luminous intensity of 1300 mcd and a light guide plate with a thickness of 0.6 mm) such that a support of the light diffusing sheet was opposed to the light guide plate of the backlight, to prepare a backlight of each Example.

3. Evaluation (1) Front Luminance

Figure 2:
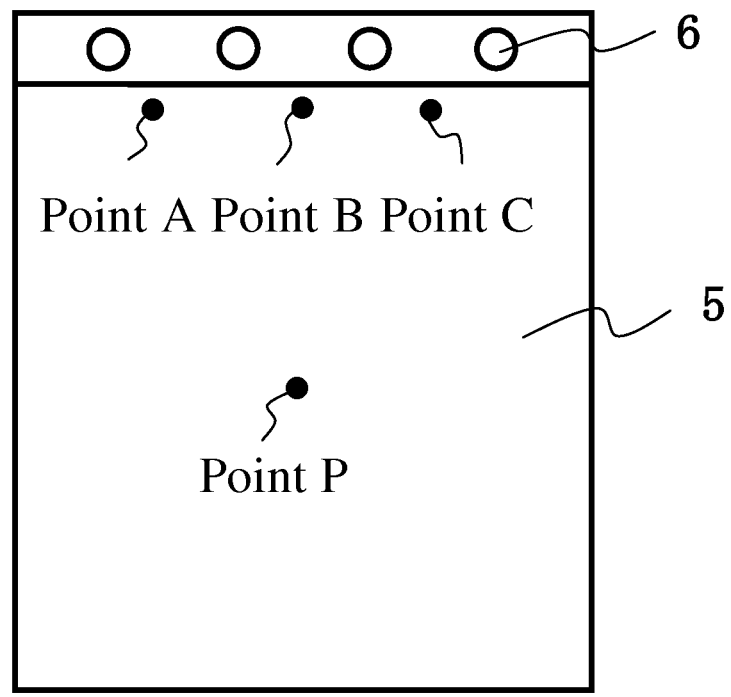
FIG. 2 is a reference view that complements the evaluation method of the presently disclosed subject matter.

The backlight obtained in each Example was turned on, and front luminance at point P near the center of the light exit surface of backlight 5 as shown in FIG. 2 was measured. The measurement results are shown in Tables 3 and 4 (unit is "cd/m$^2$"). In addition, the ratios of front luminance in each Example when front luminance of the backlight of Comparative Example 3 is 100% are shown in Tables 3 and 4.

TABLE 3

| | Front Luminance (cd/m$^2$) | Luminance Ratio (%) (to Comparative Example 3) |
|---|---|---|
| Example 1 | 3290 | 108.0 |
| Example 2 | 3267 | 107.3 |
| Comparative Example 1 | 3064 | 100.6 |
| Comparative Example 2 | 3053 | 100.3 |
| Comparative Example 3 | 3045 | 100.0 |

TABLE 4

| | Front Luminance (cd/m$^2$) | Luminance Ratio (%) (to Comparative Example 3) |
|---|---|---|
| Example 1 | 3290 | 108.0 |
| Example 3 | 3220 | 105.7 |
| Example 4 | 3220 | 105.7 |
| Comparative Example 2 | 3053 | 100.3 |
| Comparative Example 3 | 3045 | 100.0 |

As is seen from the results of Table 1 and Table 3, the backlights of Examples 1 and 2 using the light diffusing sheets of Examples 1 and 2 had a kurtosis Rku of not less than 3.0 and had an arithmetic mean roughness Ra of not more than 1.5 μm in a light diffusion layer of the light diffusing sheet, and thus exhibited high front luminance.

As is seen from the results of Table 2 and Table 4, the backlights of Examples 1, 3 and 4 using the light diffusing sheets of Examples 1, 3 and 4 had a ratio of the mean length of roughness curve elements RSm to the mean height of roughness curve elements Rc, RSm/Rc of not less than 7.0 μm in a light diffusion layer of the light diffusing sheet, and thus exhibited high front luminance.

In addition, diffusibility of the backlights of Examples 1 to 4 using the light diffusing sheets of Examples 1 to 4 was evaluated. First, for the backlight obtained in each Example, front luminance at points A to C (all were located on between two adjacent light sources 6) near light sources 6 as shown in FIG. 2 was measured. Subsequently, displacement of front luminance between points P and A (ratio of front luminance at point A divided by front luminance at point P), as well as displacement of front luminance between points P and B and displacement of front luminance between points P and C were calculated, to calculate the mean value of the three displacements (light uniformity in the entire backlight). The measurement results of front luminance at points A to C and P are shown in Tables 5 and 6, and the calculation results of displacements between points P and A, between points P and B, and between points P and C, and the mean values thereof (light uniformity in the entire backlight) are shown in Tables 7 and 8.

TABLE 5

| | Front Luminance (cd/m$^2$) | | | |
|---|---|---|---|---|
| | Point A | Point B | Point C | Point P |
| Example 1 | 2581 | 2568 | 2535 | 3290 |
| Example 2 | 2527 | 2484 | 2439 | 3267 |

TABLE 6

| | Front Luminance (cd/m$^2$) | | | |
|---|---|---|---|---|
| | Point A | Point B | Point C | Point P |
| Example 1 | 2581 | 2568 | 2535 | 3290 |
| Example 3 | 2526 | 2540 | 2442 | 3234 |
| Example 4 | 2503 | 2577 | 2416 | 3220 |

TABLE 7

| | Displacement of Front Luminance (%) | | | Mean Value (%) |
|---|---|---|---|---|
| | Between Points P and A | Between Points P and B | Between Points P and C | |
| Example 1 | 78.4 | 78.1 | 77.1 | 77.9 |
| Example 2 | 77.3 | 76.0 | 74.7 | 76.0 |

TABLE 8

| | Displacement of Front Luminance (%) | | | Mean Value (%) |
|---|---|---|---|---|
| | Between Points P and A | Between Points P and B | Between Points P and C | |
| Example 1 | 78.4 | 78.1 | 77.1 | 77.9 |
| Example 3 | 78.1 | 78.5 | 75.5 | 77.4 |
| Example 4 | 77.7 | 80.0 | 75.0 | 77.6 |

It could be seen from the results of Table 5 and Table 7 that the backlights of Examples 1 and 2 using the light diffusing sheets of Examples 1 and 2 both had a mean value of front luminance over 75%, and thus diffusibility was maintained.

On the other hand, the backlight of Comparative Example 1 using the light diffusing sheet of Comparative Example 1 had a kurtosis Rku of less than 3.0 and had an arithmetic mean roughness Ra over 1.5 μm in a light diffusion layer of the light diffusing sheet, and thus had poor front luminance as compared to Examples.

In addition, the backlight of Comparative Example 2 using the light diffusing sheet of Comparative Example 2 had a kurtosis Rku of not less than 3.0 but had an arithmetic mean roughness Ra over 1.5 μm in a light diffusion layer of the light diffusing sheet, and thus had poor front luminance as compared to Examples.

Furthermore, the backlight of Comparative Example 3 using the light diffusing sheet of Comparative Example 3 had an arithmetic mean roughness Ra of not more than 1.5 μm but had a kurtosis Rku of less than 3.0 in a light diffusion layer of the light diffusing sheet, and thus had poor front luminance as compared to Examples.

It could be seen from the results of Table 6 and Table 8 that the backlights of Examples 1, 3 and 4 using the light diffusing sheets of Examples 1, 3 and 4 all had a mean value of front luminance over 75%, and thus diffusibility was maintained. Incidentally, it could be confirmed that the backlight of Example 1 using the light diffusing sheet of Example 1 meeting all conditions 1 to 3 of the presently disclosed subject matter specifically had high front luminance and diffusibility, and balance of both was most satisfied.

On the other hand, the backlights of Comparative Examples 2 and 3 using the light diffusing sheets of Comparative Examples 2 and 3 had a ratio of the mean length of roughness curve elements RSm to the mean height of roughness curve elements Rc, RSm/Rc of less than 7.0 μm in a light diffusion layer of the light diffusing sheet, and thus had poor front luminance as compared to Examples.

DESCRIPTION OF REFERENCE SIGNS

1 Light Diffusing Sheet
2 Diffusion Layer
3 Support
4 Diffusing Agent
5 Backlight
6 Light Source

The invention claimed is:

1. A light diffusing sheet comprising a diffusion layer, wherein the diffusion layer has a surface profile that satisfies a condition under which when the mean height (JIS B0601, 2001) of roughness curve elements as determined by two-dimensional surface profile measurement is represented by Rc and the mean length (JIS B0601, 2001) of roughness curve elements as determined by two-dimensional surface profile measurement is represented by RSm, the ratio of RSm to Rc (RSm/Rc) is not less than 7.0 and not more than 30.0.

2. The light diffusing sheet according to claim 1, wherein the diffusion layer has a surface profile that satisfies the following conditions 1 and 2:
   Condition 1: a condition under which when the kurtosis (JIS B0601, 2001) of a roughness curve as determined by two-dimensional surface profile measurement is represented by Rku, Rku is not less than 3.0, and
   Condition 2: a condition under which when the arithmetic mean roughness (JIS B0601, 2001) as determined by two-dimensional surface profile measurement is represented by Ra, Ra is not more than 1.5 μm.

3. The light diffusing sheet according to claim 2, which is used in a backlight in which a high brightness LED light source is incorporated.

4. A backlight comprising at least a light source, an optical plate for light guiding or diffusion disposed adjacent to the light source, and a light diffusing sheet disposed on the light exit side of the optical plate, wherein the light diffusing sheet is the light diffusing sheet according to claim 2.

5. The backlight according to claim 4, wherein the light source is an LED light source.

6. The light diffusing sheet according to claim 1, wherein the diffusion layer has a surface profile that satisfies said condition of claim 1.

7. The light diffusing sheet according to claim 6, which is used in a backlight in which a high brightness LED light source is incorporated.

8. A backlight comprising at least a light source, an optical plate for light guiding or diffusion disposed adjacent to the light source, and a light diffusing sheet disposed on the light exit side of the optical plate, wherein the light diffusing sheet is the light diffusing sheet according to claim 6.

9. The backlight according to claim 8, wherein the light source is an LED light source.

10. The light diffusing sheet according to claim 1, which is used in a backlight in which a high brightness LED light source is incorporated.

11. A backlight comprising at least a light source, an optical plate for light guiding or diffusion disposed adjacent to the light source, and a light diffusing sheet disposed on the light exit side of the optical plate, wherein the light diffusing sheet is the light diffusing sheet according to claim 1.

12. The backlight according to claim 11, wherein the light source is an LED light source.

13. The light diffusing sheet according to claim 1, wherein the condition further includes a condition under which Rc is not less than 3.0 μm and not more than 8.0 μm.

14. The light diffusing sheet according to claim 1, wherein the diffusion layer includes a diffusion agent.

* * * * *